(12) United States Patent
Forbes

(10) Patent No.: US 6,321,864 B1
(45) Date of Patent: Nov. 27, 2001

(54) SNOW VEHICLE TRACK SUSPENSION

(76) Inventor: Vernal D. Forbes, 4146 Marylebone Way, Boise, ID (US) 83713

( * ) Notice: Subject to any disclaimer, the term of this patent is extended or adjusted under 35 U.S.C. 154(b) by 0 days.

(21) Appl. No.: 09/613,701

(22) Filed: Jul. 11, 2000

Related U.S. Application Data
(60) Provisional application No. 60/200,721, filed on Apr. 27, 2000.

(51) Int. Cl.$^7$ .................................................. B60M 27/02
(52) U.S. Cl. ............................ 180/193; 305/127; 180/190
(58) Field of Search .................................. 280/212, 215, 280/217, 12.1; 180/186, 187, 190, 191, 193, 182, 184, 192, 9.25, 9.5, 9.54, 9.56; 305/127

(56) References Cited

U.S. PATENT DOCUMENTS

| | | | |
|---|---|---|---|
| 3,667,562 | 6/1972 | Compton | 180/5 R |
| 3,682,495 | 8/1972 | Zaimi | 280/12.14 |
| 3,719,369 | 3/1973 | Savage | 280/28 |
| 3,787,066 | 1/1974 | Hautier | 280/217 |
| 3,804,455 | 4/1974 | Gorski | 296/28 J |
| 3,822,755 | 7/1974 | Hine | 180/5 R |
| 4,146,101 | 3/1979 | Plourde | 180/5 R |
| 4,244,436 | 1/1981 | Condon et al. | 180/191 |
| 4,314,618 | 2/1982 | Tamura | 180/193 |
| 4,421,193 | 12/1983 | Bissett | 180/192 |
| 4,442,913 | 4/1984 | Grinde | 180/190 |
| 4,488,616 | 12/1984 | Harris | 180/185 |
| 4,502,560 | 3/1985 | Hisatomi | 180/190 |
| 4,613,006 | 9/1986 | Moss et al. | 180/9.25 |
| 4,714,125 | 12/1987 | Stacy, Jr. | 180/182 |
| 4,719,983 | 1/1988 | Bruzzone | 180/184 |
| 4,823,903 | 4/1989 | Bibollet et al. | 180/193 |
| 4,917,207 | 4/1990 | Yasui et al. | 180/193 |
| 5,102,153 | 4/1992 | Rhode | 280/7.14 |
| 5,109,941 | 5/1992 | Thompson | 180/182 |
| 5,265,692 | * 11/1993 | Mallette | 180/193 |
| 5,314,034 | 5/1994 | Chittal | 180/21 |
| 5,423,559 | 6/1995 | Rhode | 280/12.14 |
| 5,433,466 | 7/1995 | Timmer | 280/288.4 |
| 5,474,146 | 12/1995 | Yoshioka et al. | 180/184 |
| 5,586,614 | 12/1996 | Kouchi et al. | 180/190 |
| 5,692,579 | * 12/1997 | Peppel et al. | 180/190 |
| 5,727,643 | 3/1998 | Kawano et al. | 180/193 |
| 5,730,242 | * 3/1998 | Furusawa | 180/193 |
| 5,860,486 | 1/1999 | Bolvin et al. | 180/193 |

(List continued on next page.)

OTHER PUBLICATIONS

Author unknown, "Thrown For A Loop With Honda's Motosled," The Buzz–News & Rumors, Snowgoer Magazine, Aug. 1997, p. 17.

(List continued on next page.)

Primary Examiner—Brian L. Johnson
Assistant Examiner—Daniel Yeagley
(74) Attorney, Agent, or Firm—Ormiston & McKinney, PLLC

(57) ABSTRACT

An improved snow vehicle track suspension employing a force-distributing mechanism comprising a swingarm, a three-arm bell crank, a connecting linkage, and a telescoping limiter linkage. The force-distributing mechanism apportions cushioning force from a shock absorber to track carriage components that bear upon a lower run of an endless-loop track to establish a desired weighting distribution of the track upon the surface of the snow. The force-distributing mechanism allows the track carriage to incline and decline within a limited angular range to enable the track to maintain tractional compliance with the surface of the snow.

32 Claims, 12 Drawing Sheets

U.S. PATENT DOCUMENTS

| | | | | |
|---|---|---|---|---|
| 5,881,834 | * | 3/1999 | Karpik | 180/193 |
| 5,904,216 | | 5/1999 | Furusawa | 180/193 |
| 5,904,217 | | 5/1999 | Furasawa | 180/193 |
| 5,947,220 | | 9/1999 | Oka et al. | 180/193 |
| 5,967,534 | | 10/1999 | Bradley, Jr. | 280/47.371 |
| 6,032,752 | | 3/2000 | Karpik et al. | 180/9.52 |
| 6,112,840 | * | 9/2000 | Forbes | 180/193 |

OTHER PUBLICATIONS

Author unknown, "Another New Snow Scooter," Snowgoer Digest, Snowgoer Magazine, Dec. 1997, p. 30.

Yangsheng Xu, "A Single–Wheel Gyroscopically Stabilized Robot (Gyrover)," Internett address: http://www.cs.cmu–edu/afs/ds.cmu.edu/project/space/www/gyrover.html.

Dr. Pradeep K. Kholsa, "A Single–Wheeled Gyroscopically Stabilized Robot," Internet address: http://www.cs.cmu–edu/afs/cs.cmu.edu/project/chimera/www/research/DRS/index.html.

Author unknow, "The Gyrotron—A Human Sized Gyroscope," Internet address: http://newciv.org/GIB/BI/BI–240.html.

* cited by examiner

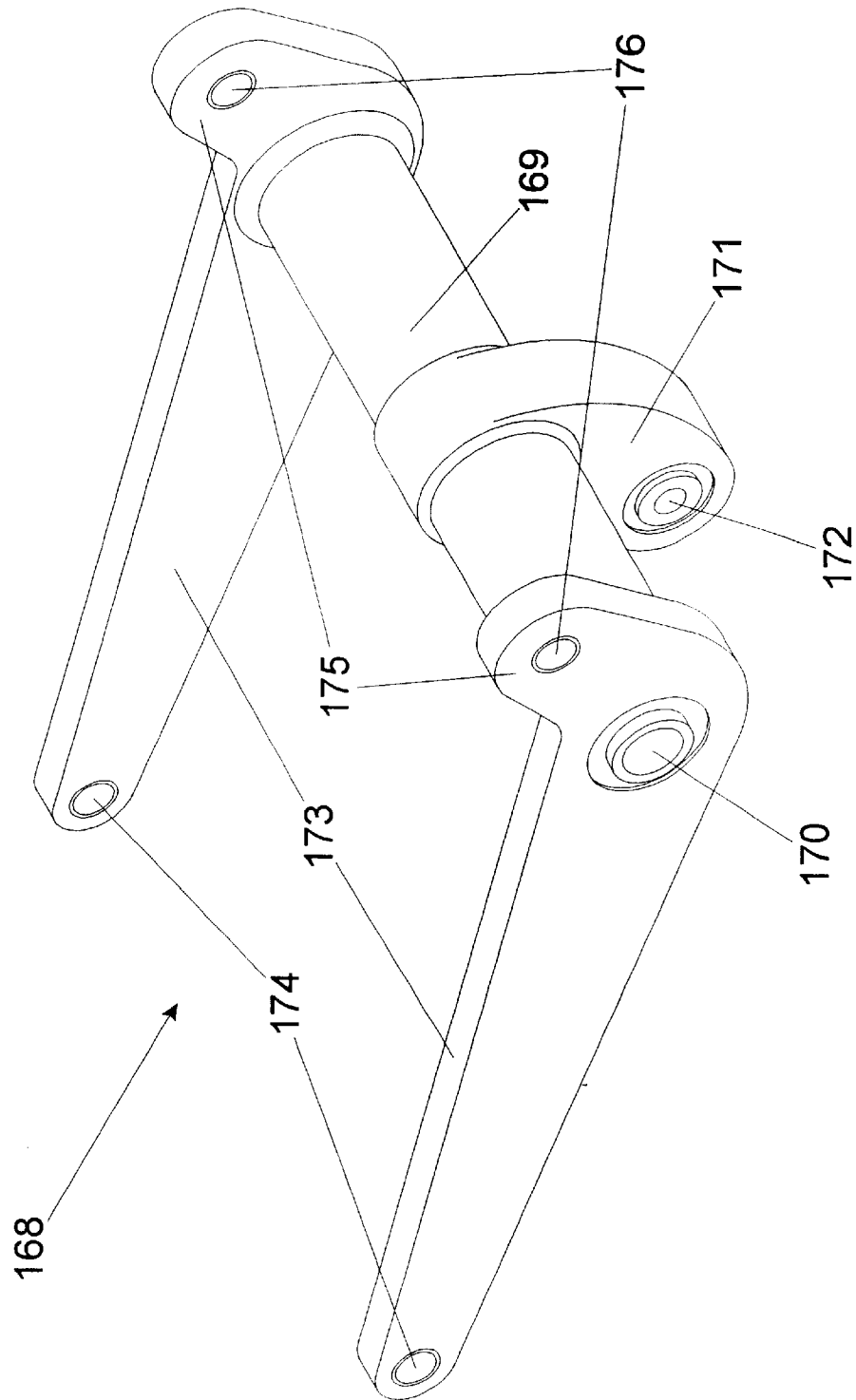

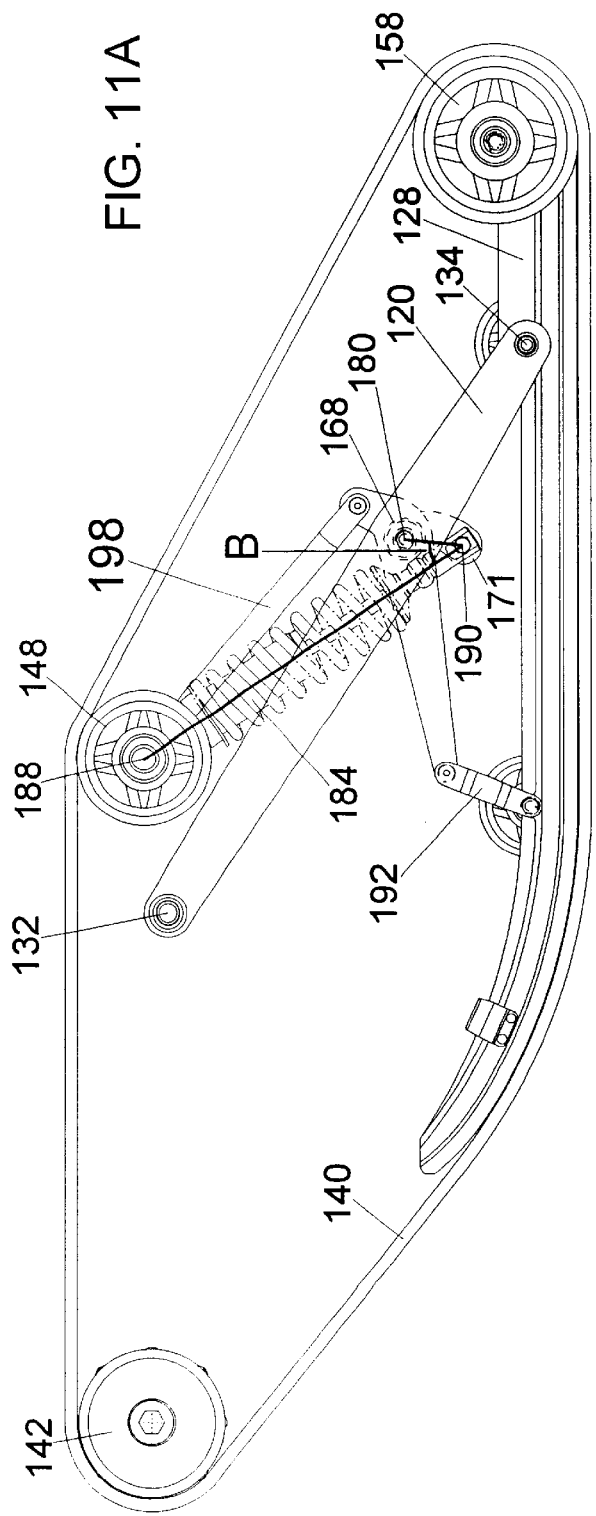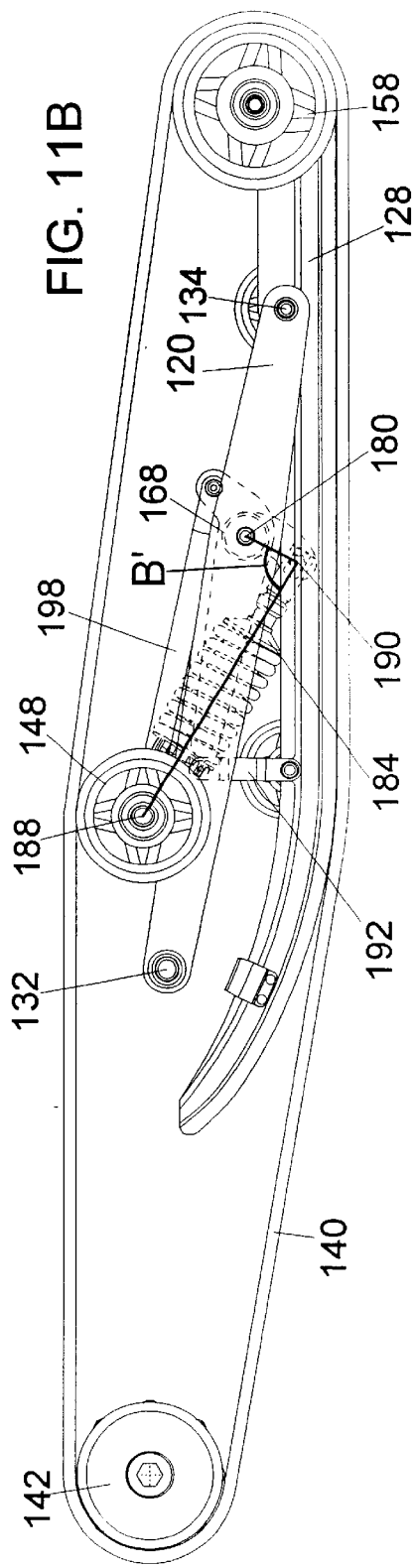

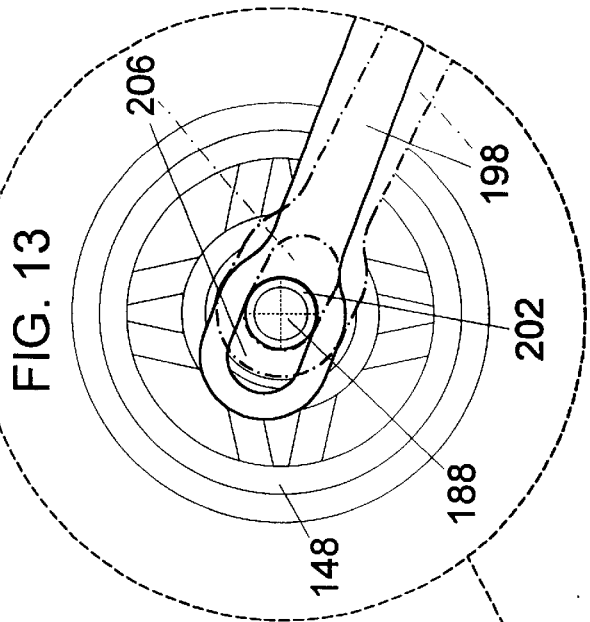
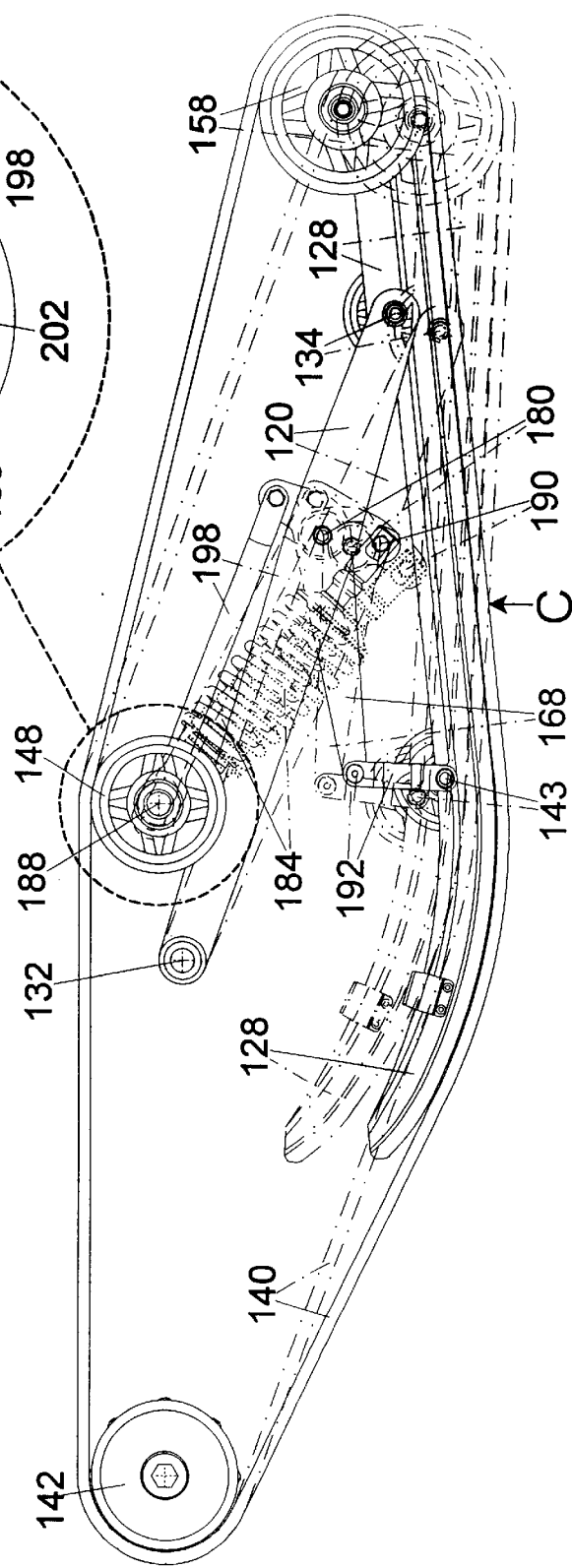

SNOW VEHICLE TRACK SUSPENSION

CROSS REFERENCE TO RELATED APPLICATION

This Application claims subject matter disclosed in the copending provisional application Ser. No. 60/200721 filed Apr. 27, 2000 which is incorporated herein in its entirety.

FIELD OF THE INVENTION

This invention relates to a track suspension for a track-propelled snow vehicle or other track-propelled land vehicle, and more specifically to a mechanism that controls the weighting distribution of the track upon the surface of the snow or ground while allowing a limited angular range of longitudinal incline and decline of the ground contacting run of the track relative to the vehicle chassis.

DISCUSSION OF RELATED ART

Two types of personal motorized snow vehicles utilize rear suspension apparati for mounting an endless-loop track for propulsion of the snow vehicle and for supporting and cushioning the snow vehicle chassis upon the ground-contacting run of the track, namely, the well-known snowmobile and the less well-known snow cycle. The snow cycle is very similar to the snowmobile, but generally has only one steerable ski, and is leaned or banked in turning like a motorcycle or bicycle.

Snowmobile track suspensions have traditionally been heavy due to the number of structural components and the number of shock absorbers (typically two or more) used in these suspensions. The shock absorbers typically each include both a hydraulic dashpot-type damper mechanism and a coil spring surrounding the damper body, and are quite heavy. Most of these types of snowmobile track suspensions include separate forward and rearward swingarms. The forward swingarm is typically connected pivotally at a forward upper end to the vehicle chassis, and connected pivotally at a rearward lower end to a track carriage. The track carriage typically includes a pair of slide rails mounting track slides and having multiple sets of idler wheels journaled on cross-shafts with the cross-shafts attached at their ends to the slide rails. The track slides and idler wheels of the track carriage slide and roll, respectively, upon the interior of the lower run of the track to support the snowmobile upon the track. The rearward swingarm connects pivotally at its forward end to the rearward-extending portion of the snowmobile chassis called the track tunnel and a lower rearward pivot on the rearward portion of the track carriage. The rearward swingarm typically includes a telescoping mechanism that allows the separation between the forward and rearward pivots of the rearward swingarm to vary between a minimum compressed length and a maximum extended length. This telescoping relationship between the vehicle chassis and the rearward portion of the track carriage allows the track carriage to incline or decline longitudinally to a limited degree relative to the vehicle chassis to allow the track to bear uniformly on uneven snow surfaces. The degree of telescoping of the rearward swingarm is limited to prevent too severe of incline or decline angles that would overly stretch or slacken the track or would adversely affect propulsion or braking of the snowmobile. These track suspensions typically deploy one shock absorber in conjunction with the forward swingarm to support and cushion the vehicle chassis on the forward portion of the track carriage. A second shock absorber is deployed in conjunction with the rear swingarm to support and cushion the vehicle chassis on the rearward portion of the track carriage. One type of structure used to form the telescoping function of the rear swingarm is a pivot and slide-block combination where the lower swingarm mounts pivotally to a block that slides in a slot on each of the slide rails. Examples of track suspensions that use this type of structure are described in U.S. Pat. No. 5,265,692 (Mallette) and U.S. Pat. No. 5,881,834 (Karpik). Another structure employed to provide the telescoping function is a short pivot arm that attaches pivotally between the track carriage and the lower end of the rearward swingarm to form a knuckle-type pivot joint between the short pivot arm and the swingarm. Track suspensions using this type of structure are described in U.S. Pat. No. 5,730,242 (Furusawa) and U.S. Pat. No. 5,692,579 (Peppel et. al.). In the track suspension described in the Peppel et al. patent, the telescoping range of this rear swingarm structure is limited using mechanical stops that limit the angular swing of the short pivot arm. This limits the longitudinal inclination and declination of the track carriage relative to the vehicle chassis to the desired range. Furusawa employs separate telescoping members with stop bumpers to limit the telescoping range of the rearward swingarm structure. One of the primary reasons for limiting the track carriage inclination and declination in snowmobile track suspensions is to limit the variability in the path-length of the endless-loop track, thereby limiting the amount of track stretching and slacking that result when the track rails decline and incline.

The Mallete, Karpic, and Peppel track suspensions described in the patents listed above have structural geometries that result in regressive actuation of the shock absorbers. By definition, regressive actuation of the shock absorber occurs when incremental compressive displacements of the track suspension result in proportionally smaller incremental compressions of the shock absorber when the track suspension is more heavily loaded and compressed as compared to when the track suspension is less heavily loaded and compressed. Such regressive shock absorber actuation is less desirable than a linear or progressive shock absorber actuation since it provides less resistance to suspension "bottoming" and requires the suspension to be set more stiffly to avoid bottoming, thereby sacrificing ride comfort.

The track suspension described in the Furusawa patent deploys a complex bell crank and connecting rod linkage mechanism to provide progressive actuation of the rear swingarm shock absorber and spring. The actuation of the front swingarm shock absorber, however, is regressive. While progressive actuation of the rear shock absorber results in a track suspension that offers improved resistance to bottoming along with a plusher ride, this suspension has many pivoting joints and structural members, making it heavy, complex and difficult to maintain.

A single swingarm track suspension is described in U.S. Pat. No. 5,860,486 (Boivin & Boivin). This track suspension employs a tension-only member in parallelogram configuration with the single swingarm, snowmobile tunnel and track carriage to limit the range of allowable track carriage inclination relative to the vehicle chassis. The track carriage declination is limited to an acceptable amount by a mechanism that comprises a bell crank, connecting rod and tension strap connecting to the forward portion of the track carriage. While this suspension has fewer structural members and pivots, it also suffers from regressive actuation of the shock absorbers.

Snow cycle track suspensions tend to be one of two predominant types, the first of which is very similar to snowmobile track suspensions. Snow cycles of this type typically use the same general type of clutches and power trains as snowmobiles, and so these snow cycles are quite heavy, typically weighing well over 300 pounds. A snow cycle using a snowmobile style of track suspension is described in U.S. Pat. No. 5,904,217 (Yamamoto & Kouchi). This snow cycle track suspension is a two swingarm design using a slide block & slot type pivot as the lower pivot connection between the rear swingarm and the track carriage for limiting the range of track carriage inclination and declination. This track suspension also suffers from regressive shock absorber actuation, but deploys a physically separate suspension spring with nearly linear actuation as the suspension is compressed.

A second type of snow cycle track suspension is found on snow cycles whose designs are based on off-road motorcycles and motor scooters. These track suspensions most often have shorter tracks that circulate in fixed paths around track carriages. Their snow cycle bodies are supported and cushioned upon their track carriages using shock absorber mechanisms that are deployed external to their track loops. Examples of such track suspensions are described in U.S. Pat. No. 4,442,913 (Grinde), U.S. Pat. No. 4,613,006 (Moss), U.S. Pat. No. 4,823,903 (Bibollet), and U.S. Pat. No. 5,474,146 (Yoshioka et. al.). With the exception of the track suspension design described in the Yoshioka patent, these track suspensions offer very limited suspension travel of only a few inches, and have very little ability for the track carriages to incline or decline to tractably follow undulations in the snow surface. While the track suspension described in the Yoshioka patent is capable of offering 10 or more inches of suspension travel, it utilizes a large, cumbersome track carriage that extends rearward from the snow cycle, making it quite long and heavy. This design has no provision to limit the track inclination or declination to a nearly level attitude to maintain good traction, particularly in soft powder snow.

SUMMARY

The present invention is directed to an improved track suspension for snow vehicles of the type having an endless-loop track for propulsion of the snow vehicle upon the snow. This track suspension employs a force-distributing, motion-limiting mechanism comprising a swingarm, a three-arm bell crank, a connecting linkage, and a telescoping limiter linkage. This mechanism apportions cushioning force from a shock absorber to track carriage components that bear upon a lower run of an endless-loop track in a manner to control the weighting distribution of the track upon the surface of the snow. This mechanism also allows the track carriage to incline and decline relative to the chassis of the snow vehicle within a limited angular range to enable the track to maintain tractional compliance with the surface of the snow.

It is the general object of the present invention to provide an improved track suspension for a snow cycle of the type described in U.S. patent application Ser. No. 09/030639 using a three-arm force-distributing bell crank mechanism that progressively actuates a single shock absorber and integral coil spring as the suspension is compressed while limiting the track carriage inclination and declination to a desirable angular range throughout the full compressive travel of the snow cycle track suspension.

A further object of the present invention is to control the range of the angular inclination and declination of the track carriage using a selected telescoping member deployed between the third arm of the force-distributing bell crank and the snow cycle chassis.

Yet another object of the present invention is the deployment of the three-arm bell crank mechanism in a single-swingarm snowmobile track suspension embodiment that offers improved progressiveness of the shock absorber actuation, controlled angular inclination and declination of the track carriage, reduced track tension variation, reduced weight and fewer components compared to conventional snowmobile track suspensions.

BRIEF DESCRIPTION OF THE DRAWINGS

FIG. 10 is an isometric perspective view of the three-arm bell crank of the snowmobile suspension embodiment of the present invention.

FIG. 11A is a side view of the snowmobile track suspension showing the track suspension fully extended.

FIG. 11B is a side view of the snowmobile track suspension showing the track suspension fully compressed.

FIG. 12 is a side view of the snowmobile track suspension approximately 50% compressed illustrating maximum track carriage declination (shown in solid lines) and maximum track carriage inclination (shown in dash-dot lines) as limited by the limiter links.

FIG. 13 is a close-up partial view of the snowmobile track suspension of FIG. 12 showing a view of the upper end of one of the limiting links in maximum track rail declination position (shown in solid lines) and maximum track rail inclination position (shown in dash-dot lines).

DESCRIPTION

In the following descriptions, certain components may be referred to in the plural when a single reference number is used to identify the plural components, and only one of the plurality of that component may be shown in a referenced figure. The plurality of components designated by a singular reference number are generally the same in structure and function in tandem. The specific methods of attachment, mounting, and joining of described components is not herein disclosed because several different joining and attachment methods suitable for these structures are well known in the art. Likewise, the specific methods of journaling used for the pivots and bearings of the preferred embodiments are not disclosed because many different suitable methods of journaling are well know in the art.

Snow Cycle Track Suspension Embodiment—Structural Description

Figure 1:
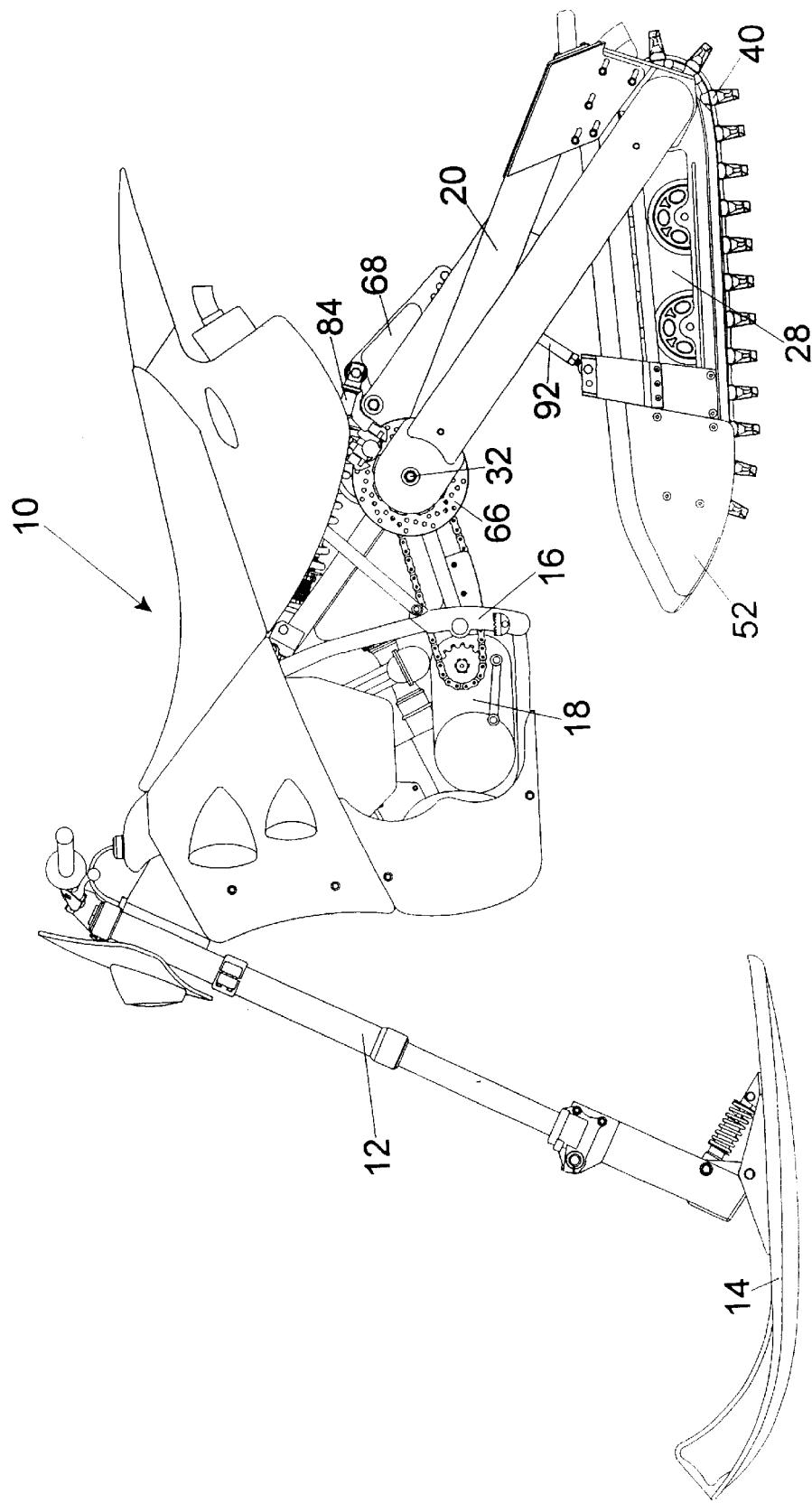
FIG. 1 is a side view of a snow cycle employing a first embodiment of the present invention.

FIG. 1 represents in side view a snow cycle 10 of the type that benefits from the improvements of the present invention. Snow cycle 10 generally includes a steering and suspension fork 12, a ski 14 pivotally attached to the lower end of steering and suspension fork 12, a chassis 16, an engine and transmission 18, a swingarm 20, and a track carriage 28. Suspension fork 12, chassis 16, and engine and transmission 18 are generally of the type used in off-road motorcycles presently being manufactured.

Figure 2:
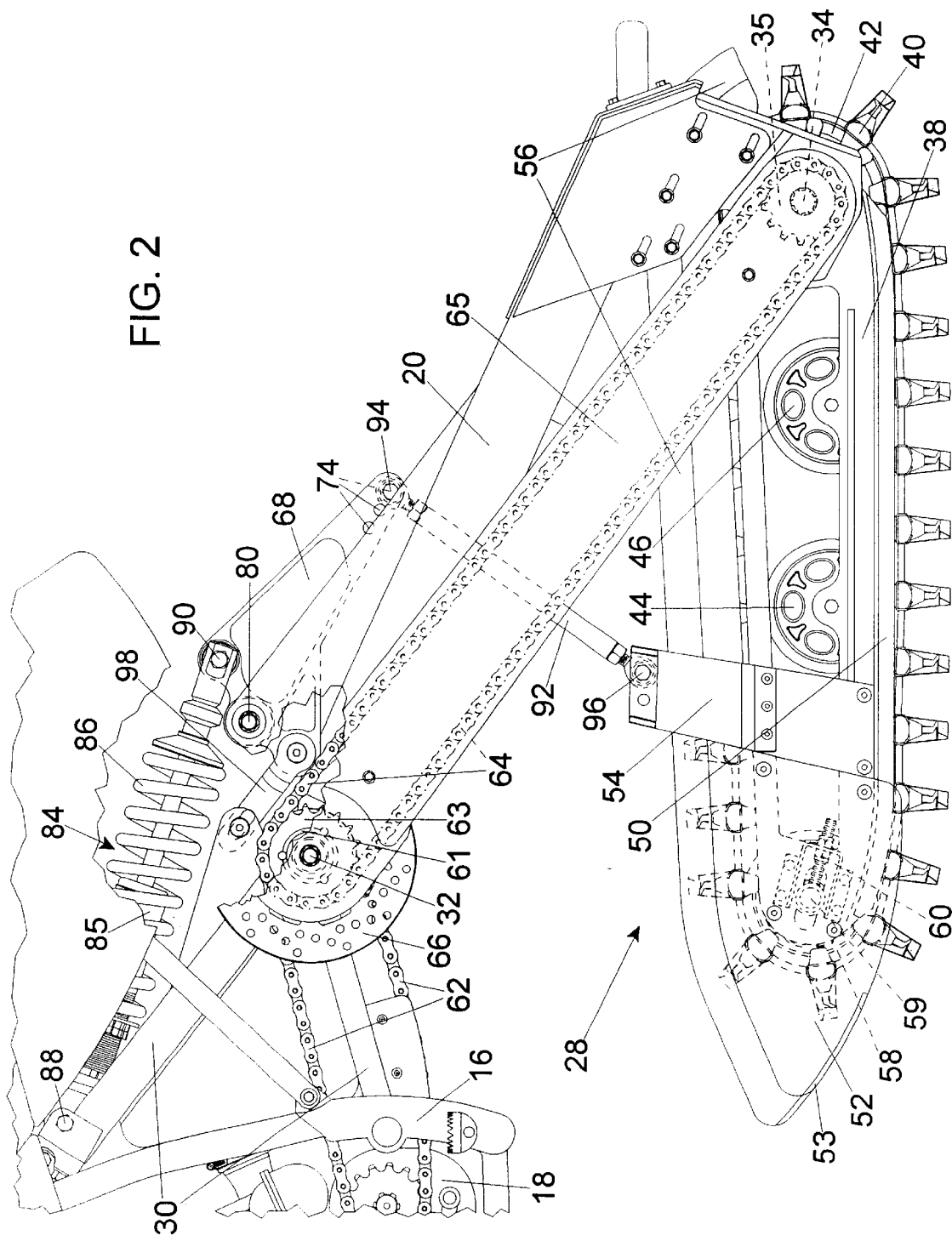
FIG. 2 is a close-up partial side view of the rear portion of the snow cycle of FIG. 1 with portions of the swingarm and disc brake cut away to more clearly illustrate the first embodiment of the present invention. The secondary drive sprockets and chain are illustrated in hidden (dotted) lines where they are covered by the secondary drive chain cover. The track, track guide wheels, track tension adjusters, and track carriage frame are also illustrated in hidden lines where they are covered by the snow ramp frame.

A first embodiment of the present invention is illustrated in FIG. 2, a side view of the rear portion of snow cycle 10. A swingarm mount frame 30 is rigidly attached to chassis 16. A swingarm upper pivot axle 32 journals swingarm 20 to swingarm mount frame 30 to allow swingarm 20 to rotate relative to swingarm mount frame 30 about swingarm upper pivot axle 32. A track drive axle 34 journals track carriage 28 to the rearward portion of swingarm 20 to allow track carriage 28 to pivot relative to swingarm 20 about track drive axle 34. Track carriage 28 includes a track carriage frame 38, an endless-loop track 40, a pair of track drive sprockets 42, a forward pair of idler wheels 44, a rearward pair of idler wheels 46, a pair of track guide wheels 58, a pair of track slides 50, a snow ramp frame 52, a suspension yoke 54, and a track fender 56. Track 40 circulates around track carriage frame 38 and is carried and guided by track drive sprockets 42, idler wheels 44 and 46, and track guide wheels 58. Track drive sprockets 42 mount to track drive axle 34 and drivingly engage track 40. Track guide wheels 58, idler wheel pairs 44 and 46, track slides 50, and track drive sprockets 42 bear upon the interior lower run of track 40 to support snow cycle 10 upon the lower run of track 40. Track guide wheels 58 are journaled upon a guide wheel shaft 59 mounted to track carriage frame 38 by means of a pair of track tension adjusters 60. Track guide wheels 58 on guide wheel shaft 59 can be adjusted forward or rearward in track carriage frame 38 using track tension adjusters 60 to properly tension track 40 upon track carriage 28. Snow ramp frame 52 is attached to the forward portion of track carriage frame 38, enclosing the forward end of track 40. A snow ramp plate 53 attaches to the lower forward portion of snow ramp frame 52. Suspension yoke 54 spans the lateral sides of the upper run of track 40 and attaches to the sides to track carriage frame 38.

Motive power for snow cycle 10 is transmitted from engine and transmission 18 through a primary drive chain 62 to a jack spindle 61 journaled on swingarm upper pivot axle 32. Motive power is further transmitted through jack spindle 61, a jack spindle sprocket 63, a secondary drive chain 64, a drive axle sprocket 35, track drive axle 34 and track drive sprockets 42 to track 40. A secondary drive chain cover 65 encloses secondary drive chain 64 and drive axle sprocket 35. A disc brake 66 mounted to jack spindle 61 applies braking force to track 40 through jack spindle 61, jack spindle sprocket 63, secondary drive chain 64, drive axle sprocket 35, track drive axle 34 and track drive sprockets 42.

Figure 3:
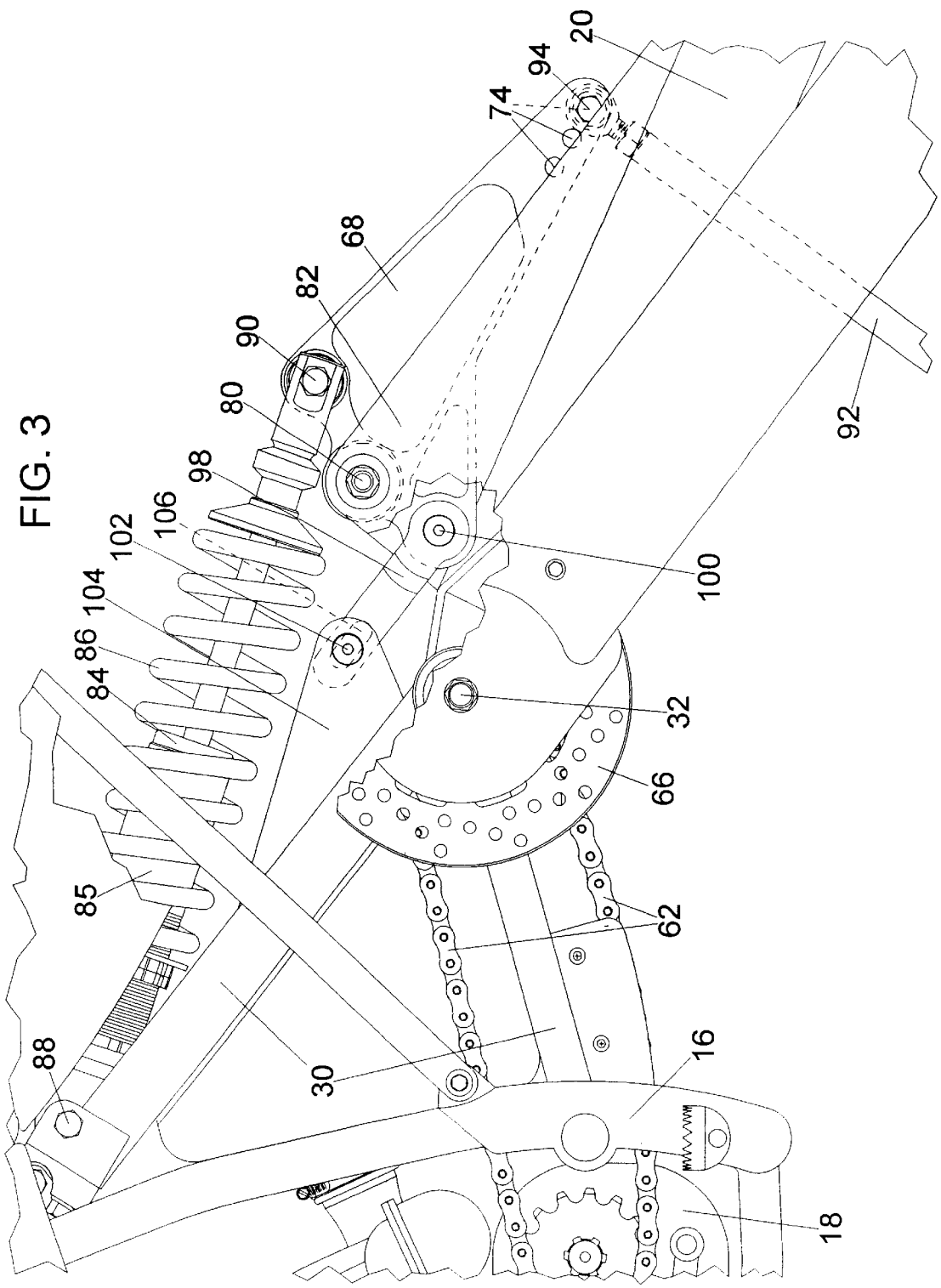
FIG. 3 is a side view of the three-arm force-distributing bell crank mechanism of the first embodiment of the present invention with portions of the swingarm, disc brake, and drive chain and sprockets cut away for clearer illustration.
Figure 4:
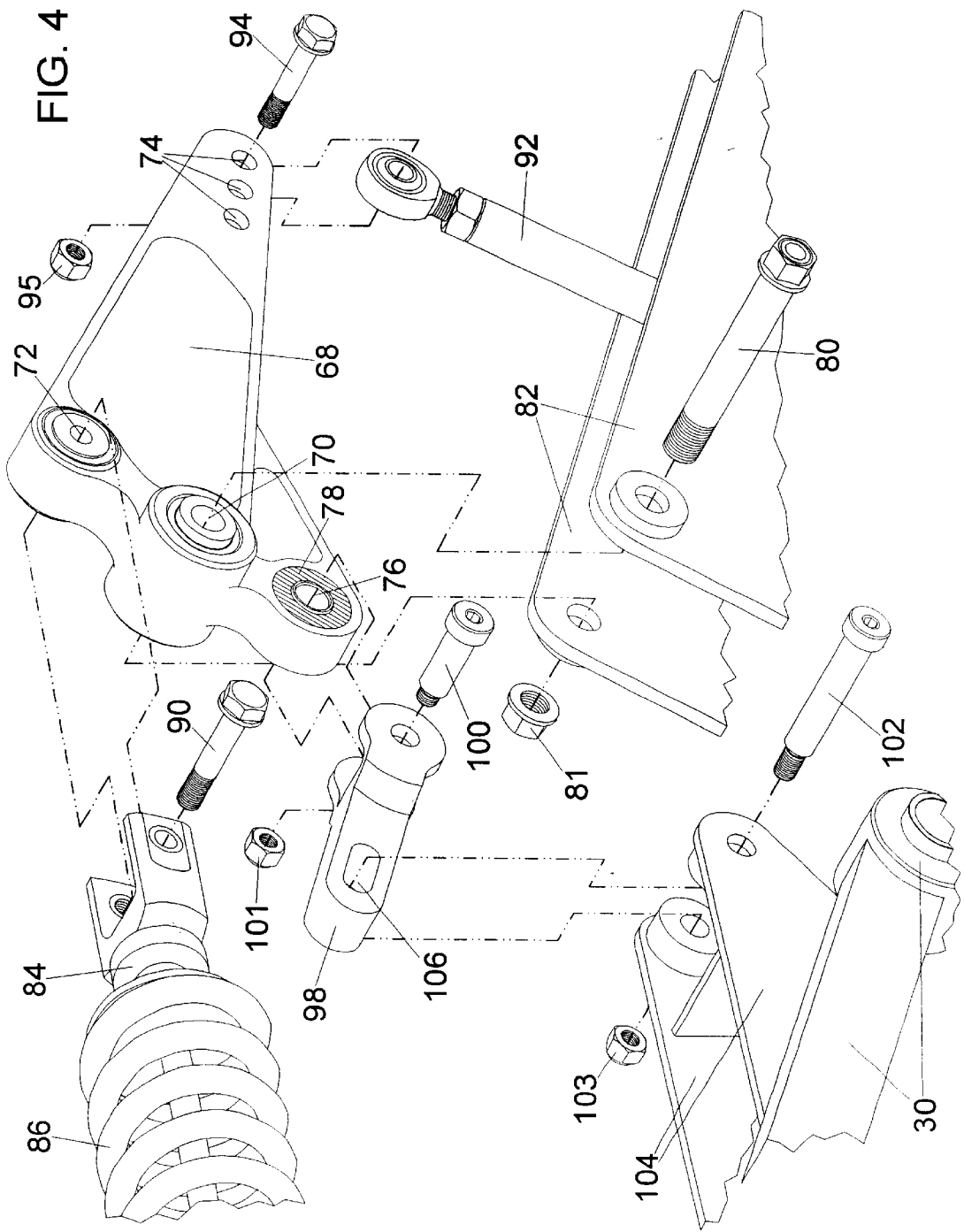
FIG. 4 is an exploded-assembly isometric view of the components of the three-arm force-distributing bell crank mechanism of the first embodiment of the invention.
Figure 5:
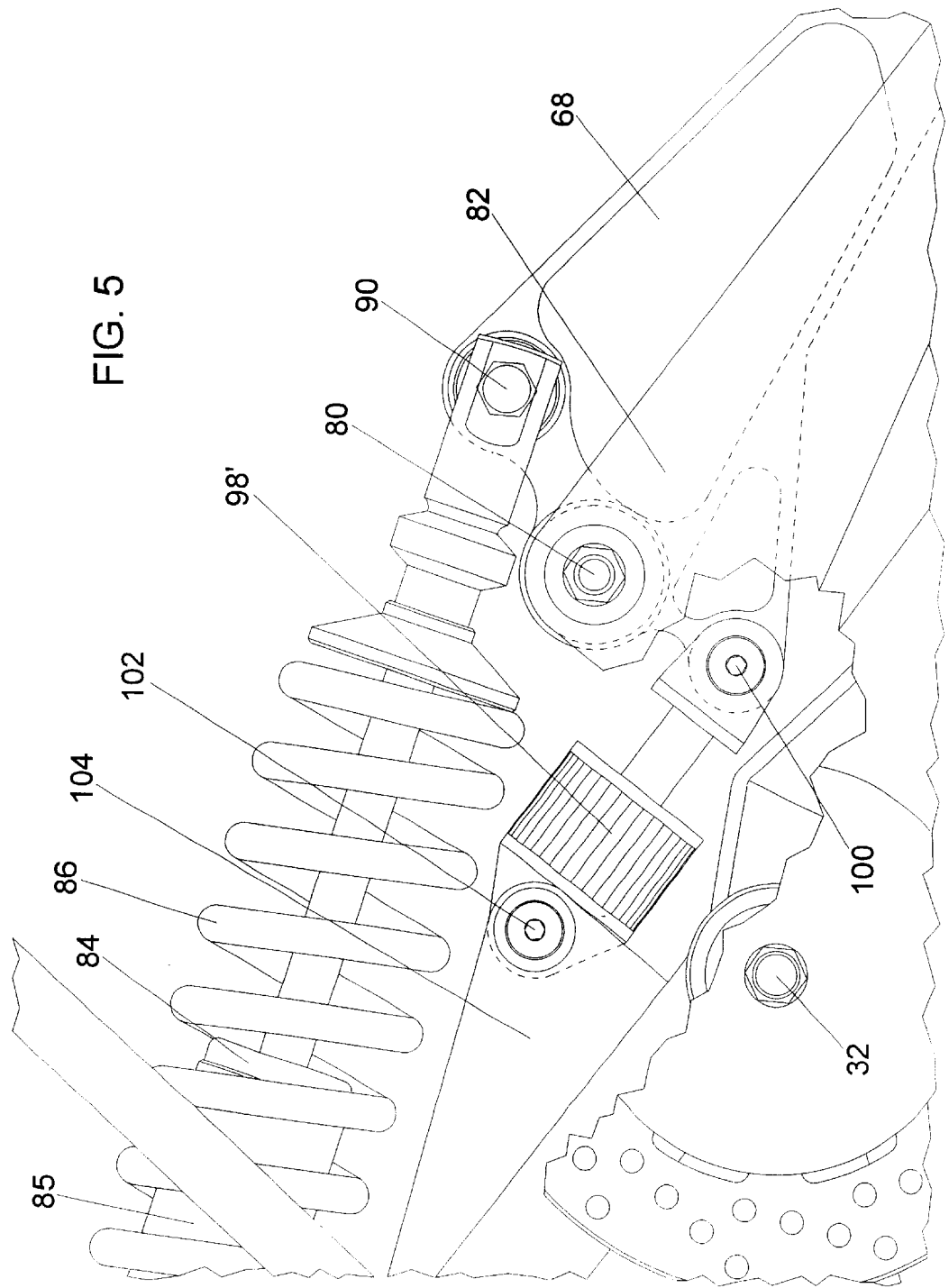
FIG. 5 is a side view of a portion the track suspension of the first embodiment showing a shock absorber deployed as the limiter link.

Referring additionally to FIGS. 3 and 4, a three-arm force-distributing bell crank 68 includes a fulcrum pivot 70, a shock absorber pivot 72, a set of connecting rod pivot holes 74, and a limiter link pivot 76. Limiter link pivot 76 is suspended in a limiter cushion 78 within bell crank 68. Limiter cushion 78, for example, is made from a suitable elastomeric compound that is adequately durable and of necessary durometer to provide a desired level of cushioning between bell crank 68 and limiter link pivot 76. Fulcrum pivot 70 of bell crank 68 is journaled upon a bell crank axle 80 that is mounted between a pair of bell crank pivot brackets 82 of swingarm 20 and secured by an axle nut 81. A shock absorber 84 comprising a hydraulic damper 85 and an integral coil spring 86 surrounding hydraulic camper 85 mounts pivotally to swingarm mount frame 30 using a pivot bolt 88. The lower end of shock absorber 84 attaches to shock absorber pivot 72 of bell crank 68 using a pivot bolt 90. A connecting rod 92 is pivotally mounted at its upper end selectively into one of connecting rod pivot holes 74 of bell crank 68 using a pivot bolt 94 and a nut 95, and is pivotally mounted to suspension yoke 54 (visible in FIG. 2) using a pivot bolt 96. A limiter link 98 connects to limiter link pivot 76 of bell crank 68 using a pivot pin 100 and a nut 101, and extends forward between a pair of limiter brackets 104 attached to swingarm mount frame 30. A limiter pin 102 mounted through limiter brackets 104 and secured with a nut 103 goes through a limiter slot 106 in limiter link 98. Limiter cushion 78, pivot pin 100, limiter link 98, limiter slot 106 and limiter pin 102 together form a resiliently-cushioned telescoping member. This combined telescoping member constrains the distance between limiter link pivot 76 of bell crank 68 and limiter pin 102 in limiter brackets 104 between predetermined minimum and maximum lengths as constrained by the length of limiter slot 106. Limiter cushion 78 softens the impact of limiter pin 102 with the ends of limiter slot 106. The telescoping and cushioning functions provided by these components could also be provided by other telescoping or cushioning mechanical means such as, for example, a shock absorber, a spring, or a combination of a shock absorber and spring. By way of example, FIG. 5 illustrates the deployment of a hydraulic damper-type shock absorber 98' in place of limiter link 98 and limiter cushion 78. Shock absorber 98' provides damped cushioning and has a minimum compressed length when shock absorber 98' is fully compressed and a maximum extended length when it is fully extended.

Snow Cycle Embodiment—Operational Description

In operation, referring to FIGS. 2–4, the first embodiment track suspension supportably cushions snow cycle 10 upon the lower run of track 40, and operates as follows. Shock absorber 84 exerts spring and damping suspension force between chassis 16 and shock absorber pivot 72 of bell crank 68, thereby urging bell crank 68 clockwise (as viewed in FIGS. 2 and 3) around bell crank axle 80 on bell crank pivot brackets 82 of swingarm 20. Bell crank 68 transmits this force from shock absorber 84 to bell crank axle 80 and to connecting rod 92 at its pivot connection with one of connecting rod pivot holes 74. The portion of the force from shock absorber 84 apportioned by bell crank 68 to connecting rod 92 is transmitted by the connecting rod to its pivot connection with suspension yoke 54, urging the forward portion of track carriage 28 downward (counterclockwise as viewed in FIG. 2) around the pivotal connection of track carriage 28 to swingarm 20 at track drive axle 34. The force from shock absorber 84 apportioned by bell crank 68 through bell crank axle 80 to bell crank pivot brackets 82 on swingarm 20 urges swingarm 20 clockwise (as viewed in FIGS. 1–3) about its pivotal connection to swingarm mount frame 30 at swingarm upper pivot axle 32. This urges the rearward end of track carriage 28 downward.

In this manner, bell crank 68 apportions the suspension force from shock absorber 84 to both the forward and rearward ends of track carriage 28 in predetermined proportion. This predetermined proportion is a design function of the distances and angular relationships between the fulcrum and pivots of bell crank 68; the distances and angular relationships between the upper pivot, lower pivot, and bell crank pivot of swingarm 20; the distance and angle between swingarm upper pivot axle 32 and the pivot connection of shock absorber 84 to swingarm mount frame 30; the length of connecting rod 92; and the distances and angle between connecting rod lower pivot bolt 96 and track drive axle 34 relative to the lower run of track 40. By adjusting these design parameters—singly or in combination—the track weighting distribution as a function of the amount of track suspension compression can be defined. The selective mounting of connecting rod 92 into one of connecting rod pivot holes 74 provides a more limited adjustment of the track weighting distribution, and can be accomplished in the field. This force-distributing bell crank suspension allows track carriage 28 to incline and decline to tractionally comply with the profile of the terrain being traversed by snow cycle 10 while maintaining a predetermined track weighting distribution. When snow cycle 10 is leaned in a tight-radius turn, track carriage 28 must decline relative to the chassis of snow cycle 10—just as ski 14 must incline— for both track and ski to track the arc of the turn.

While the ability of track carriage 28 to incline and decline is desirable to enable tractional compliance of the lower run of the track with the snow surface over uneven terrain and during banked turning, excessive inclination or declination of track carriage 28 relative to the chassis of snow cycle 10 can be detrimental. Too severe a decline angle of the track carriage relative to ski 14 can cause the front of track carriage 28 to plow down into the snow, thereby slowing or stopping the snow cycle. In soft or powder snow, the track carriage should best remain fairly level to efficiently propel the snow cycle.

Figure 6:
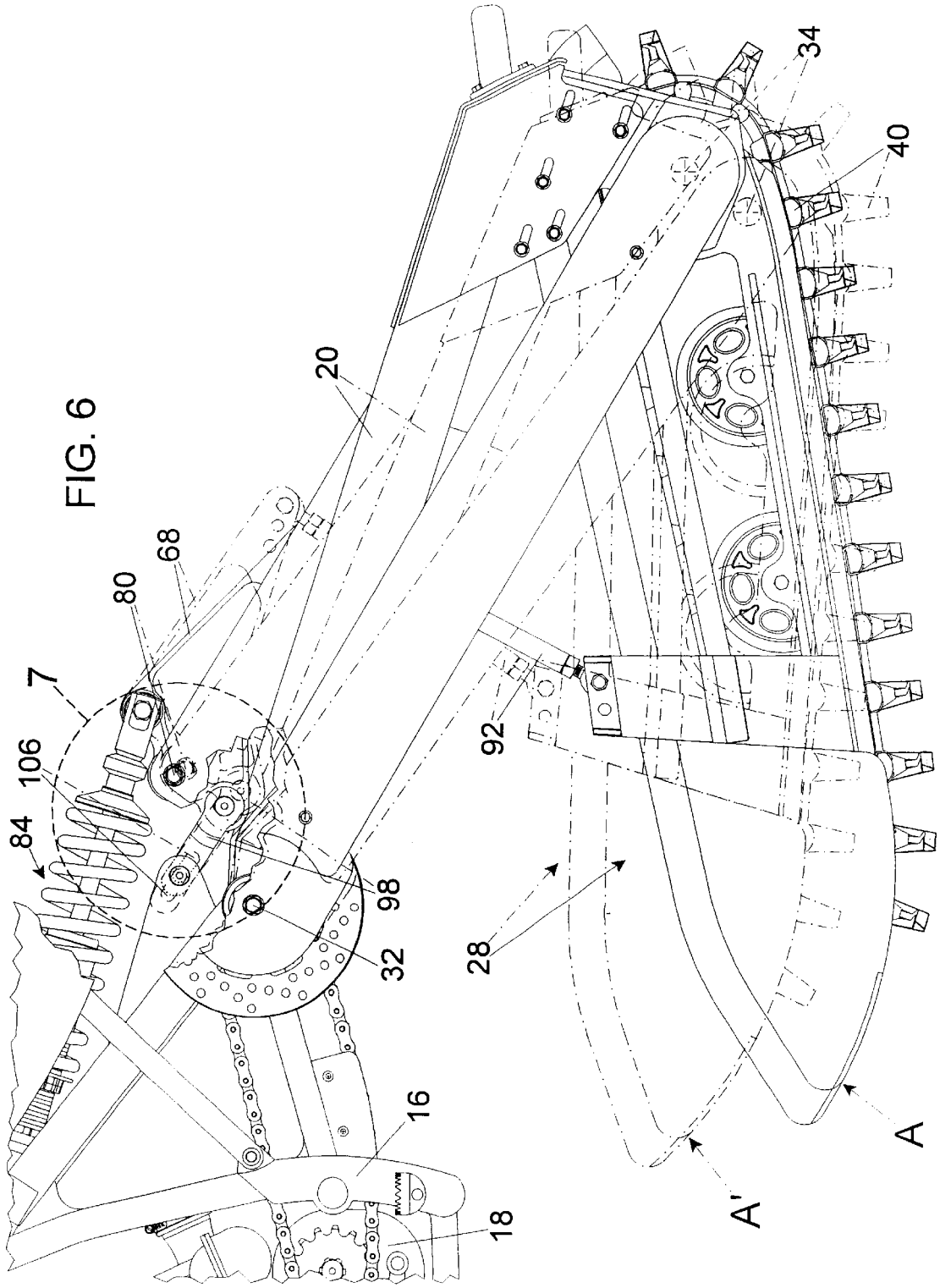
FIG. 6 is a side view of the track suspension of the first embodiment illustrating the track carriage in maximum declination (shown in solid lines) and maximum inclination (shown in dash-dot lines) as limited by the limiter link.
Figure 7:
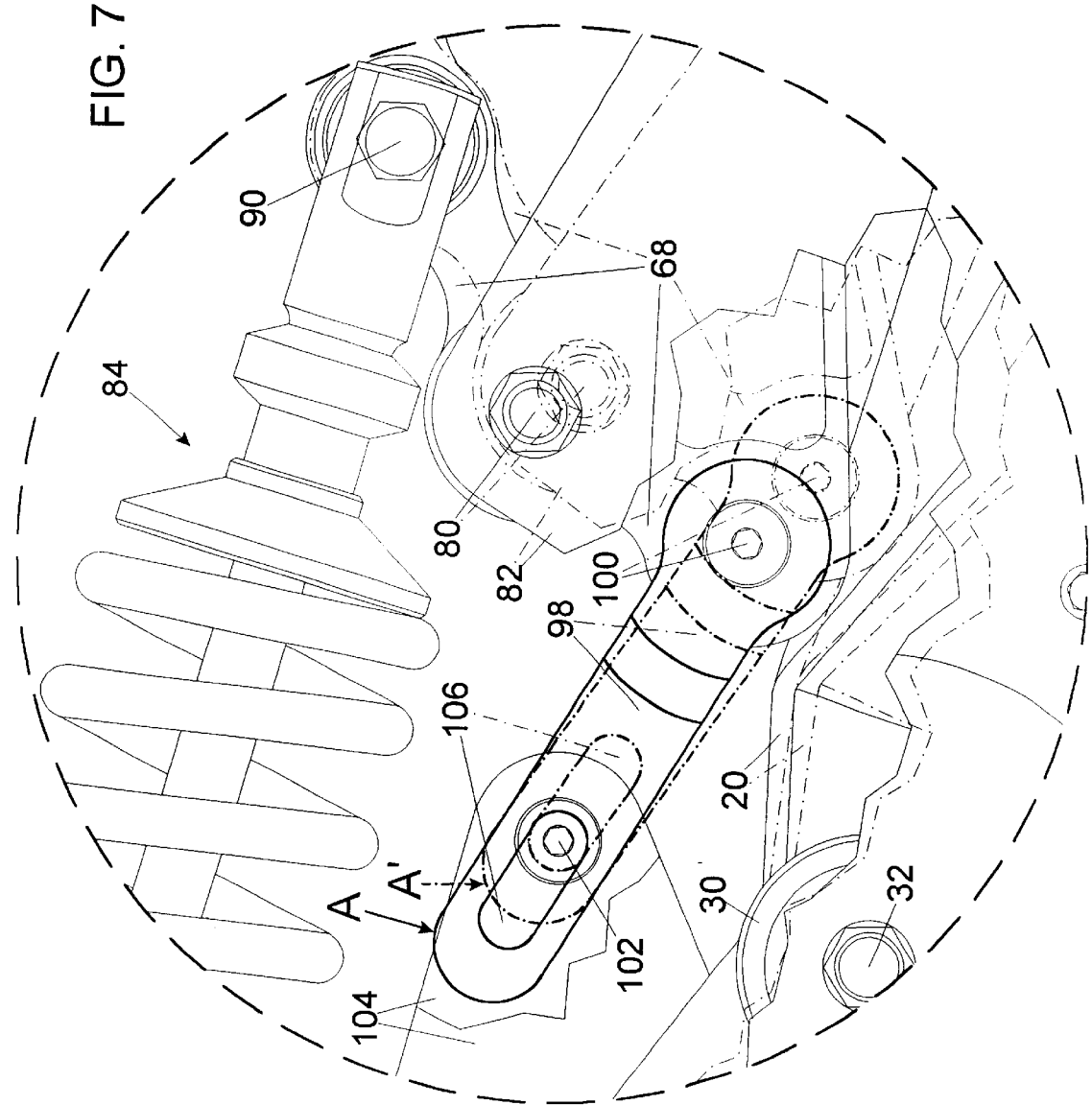
FIG. 7 is a close-up side view of that portion of FIG. 6 enclosed in the area labeled with the number 7. This Figure illustrates the operation of the limiter link in limiting the maximum track carriage declination and, in alternate position, the maximum track carriage inclination.

To constrain the amount of track carriage inclination and declination, a limiting mechanism comprising limiter link pivot 76 of bell crank 68, limiter link 98, pivot pin 100, limiter pin 102, and limiter brackets 104 on swingarm mount frame 30 is implemented. When the forces between the snow surface and the lower run of track 40 act to urge the track carriage to incline or decline, the limiting mechanism prevents excessive inclination or declination of the track carriage relative to snow cycle 10. For example as illustrated in FIGS. 6 and 7 using alternate-position (dash-dot) lines, track carriage 28 inclines (position A') as the forward portion of track carriage 28 is forced upward as would occur when the forward end of track 40 rolls up onto a bump. The upward movement of track carriage 28 forces connecting rod 92 upward, causing bell crank 68 to rotate counter-clockwise about bell crank axle 80. Since the weight loading from the snow cycle and rider on the rear suspension has not changed, the axial force in shock absorber 84 remains constant and the length of shock absorber 84 remains unchanged. The rotation of bell crank 68 therefore forces swingarm 20 to rotate clockwise, forcing the rearward portion of track carriage 28 downward to compensate for the upward movement of the front of the track carriage. Referring to FIG. 7, the counter-clockwise rotation of bell crank 68 around bell crank axle 80 pulls limiter link 98 rearward until the forward end of limiter slot 106 encounters limiter pin 102—shown in position A'. Limiter pin 102 prevents further rearward movement of limiter link 98 and limiter link 98 inhibits further rotation of bell crank 68, preventing further inclination of track carriage 28.

When the rearward end track carriage 28 is forced upward as would occur when track 40 is supported on a bump near its rearward extremity, the track carriage declines causing bell crank 68 to rotate clockwise. This forces limiter link 98 forward until the rearward end of limiter slot 106 contacts limiter pin 102. This is illustrated in FIGS. 6 and 7 with the solid line representations and labeled as position A. Limiter pin 102 prevents further forward movement of limiter link 98 and limiter link 98 inhibits further clockwise rotation of bell crank 68, preventing track carriage 28 from declining beyond a predetermined angle. The length of limiter slot 106 determines the angular range of inclination and declination allowed for track carriage 28 throughout the full range of track carriage suspension travel.

In an impact where the forces acting on track carriage 28 are not uniformly distributed along the length of the lower run of track 40, the inclination or declination of track carriage 28 is limited. This would occur, for example, when the snow cycle is landing from a jump onto a bump contacting the forward end of the track carriage. The impact-forced inclination of track carriage 28 causes bell crank 68 to rotate counter-clockwise until the forward end of limiter slot 106 of limiter link 98 contacts limiter pin 102. Limiter link 98 now prevents further separation between limiter link pivot 76 of bell crank 68 and limiter pin 102 in limiter brackets 104. Further compression of the track carriage suspension resulting from the impact force on the front of the track carriage causes bell crank 68 to pivot counter-clockwise about limiter link pivot 76. Bell crank 68 compresses shock absorber 84 and lifts swingarm 22 counter-clockwise around swingarm upper pivot axle 32, thereby preventing further inclination of track carriage 28 relative to the chassis of snow cycle 10 as the track carriage suspension is compressed by the landing impact. If the track carriage lands on a bump at its rearward end, the counterclockwise rotation of swingarm 20 around swingarm upper pivot axle 32 creates a couple between bell crank axle 80 and pivot bolt 90 at the lower end of shock absorber 84, causing bell crank 68 to rotate clockwise. This forces the forward end of track carriage 28 downward. Limiter link 98 is forced forward until the rearward end of limiter slot 106 contacts limiter pin 102. Limiter link 98 then blocks further clockwise rotation of bell crank 68. The continued impact-induced counter-clockwise rotation of swingarm 20 then forces bell crank 68 to rotate counterclockwise around pivot pin 100, compressing shock absorber 84 and lifting the forward end of track carriage 28 through connecting rod 92. The declination angle of track carriage 28 is thereby limited throughout the remainder of the impact-induced compression of the track carriage suspension. To moderate the mechanical stresses resulting from such extreme impacts, limiter link pivot 76 is suspended in limiter cushion 78 within bell crank 68, and cushions the impacts of limiter pin 102 with the ends of limiter slot 106.

Snowmobile Track Suspension Embodiment—Structural Description

While the snowmobile embodiment of the three-arm force-distributing bell crank track suspension of the present invention is quite different in structure and appearance from the snow cycle embodiment, the structural components of the two embodiments are virtually identical in purpose and function. To enable a direct comparison of the two suspension embodiments, the component designator numbers identifying the components of the snowmobile track suspension are numbered by 100 higher than those of the snow cycle track suspension previously described.

Figure 8:
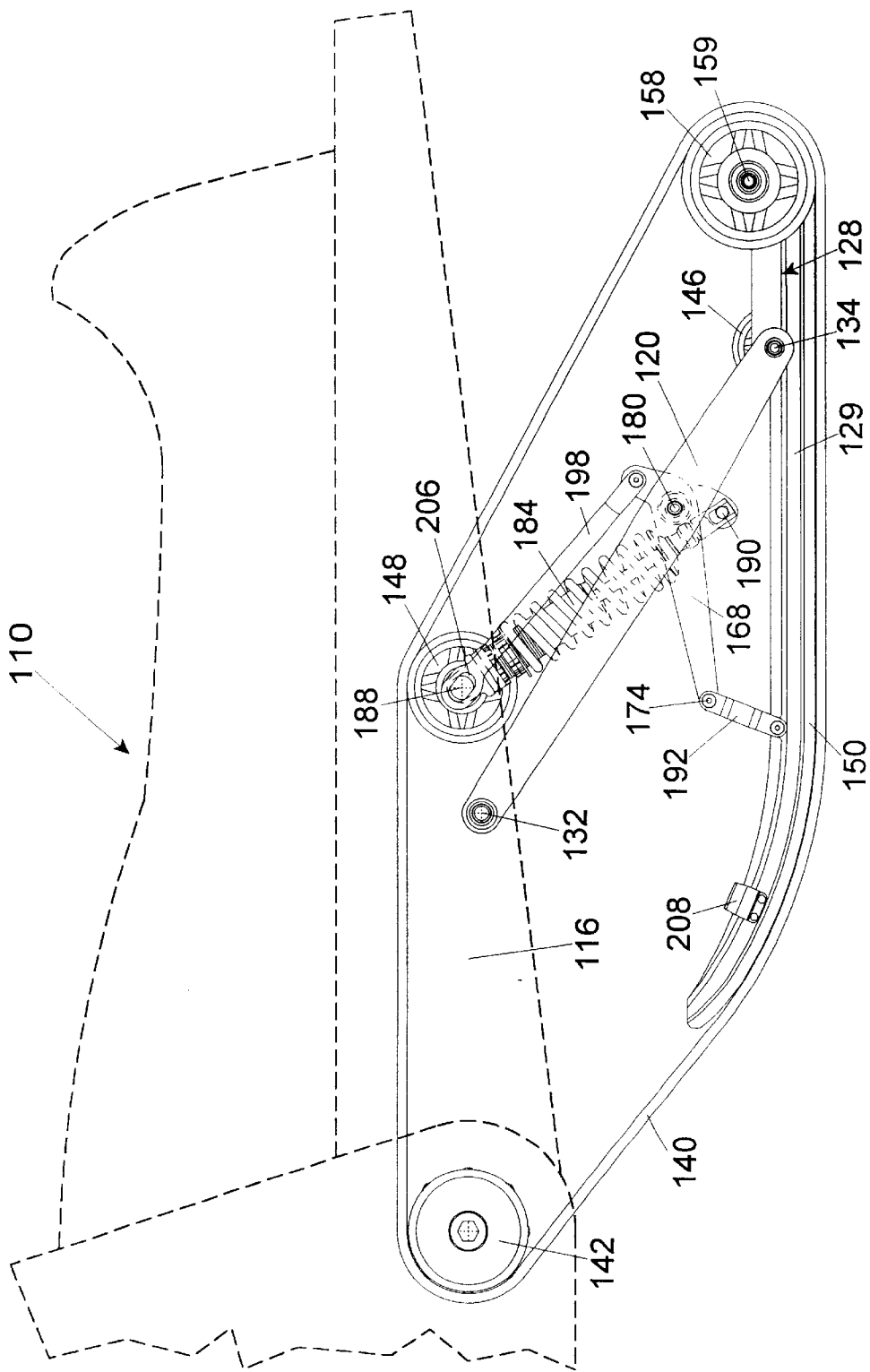
FIG. 8 is a side view of a second embodiment of the present invention, a single swingarm three-arm force-distributing bell crank snowmobile track suspension.
Figure 9:
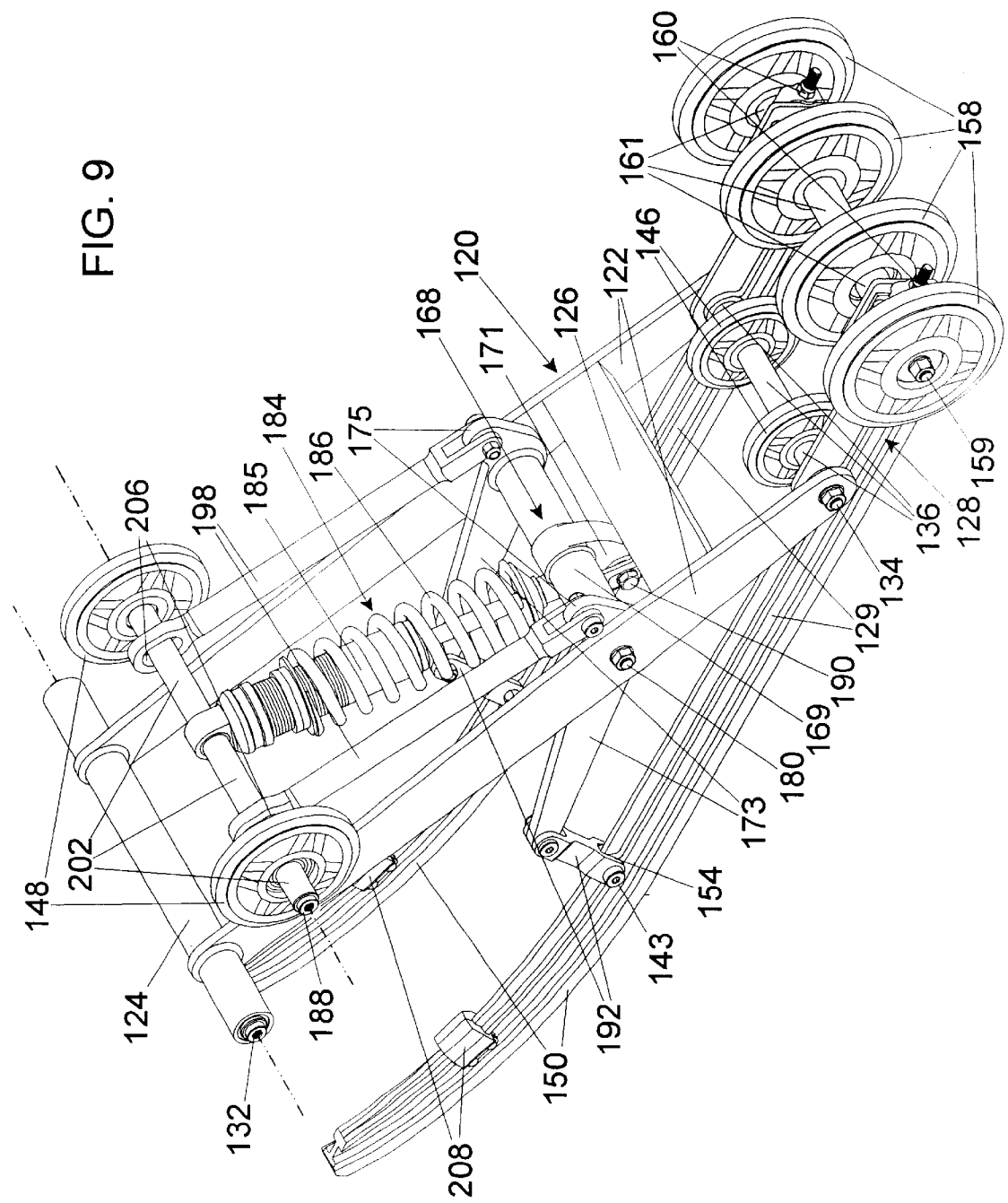
FIG. 9 is an isometric perspective view of the single-swingarm three-arm bell crank snowmobile track suspension as it would appear removed from the snowmobile.

Referring to FIGS. 8 and 9, an embodiment of the three-arm force-distributing bell crank track suspension for a snowmobile 110 includes a track carriage 128, a swingarm 120, a shock absorber 184, a three-arm bell crank 168, a pair of connecting links 192, a pair of limiter links 198, a pair of tunnel idler wheels 148 and the shafts, spacers, pivot pins and bolts and nuts to assemble these components into a functioning track suspension that can be mounted to a track tunnel 116 of snowmobile 110. (Note that in FIG. 8, the lateral left side tunnel idler wheel 148 has been removed for clarity of illustration.) Track carriage 128 includes a pair of slide rails 129, a set of four track support wheels 158 journaled on a cross-shaft 159 and held in proper position by a set of spacers 161. Track carriage 128 also includes a pair of idler wheels 146 journaled on a cross-shaft 134 and retained in proper position by a set of spacers 136. An endless-loop track 140 circulates around a set of track drive sprockets 142, slide rails 129, track support wheels 158, and tunnel idler wheels 148. A track slide 150 is attached to the lower edge of each slide rail 129 and slides upon the inner surface of the lower run of track 140. Idler wheels 146 roll upon the inner surface of the lower run of track 140. The combined set of track support wheels 158 and spacers 161 mounted on cross-shaft 159 can be adjusted forward or rearward within slots on slide rails 129 by use of a pair of track tension adjusters 160 as required to properly tension track 140.

Swingarm 120 includes a pair of laterally-spaced swingarm side members 122 welded to a tubular member 124 at their upper ends and to the ends of a swingarm cross brace 126 at their lower mid sections. Tubular member 124 of swingarm 120 is journaled on a swingarm forward cross-shaft 132. The ends of cross-shaft 132 mount to the sides of track tunnel 116. The rearward end of swingarm 120 mounts to the ends of cross-shaft 134 of track carriage 128, forming a pivoting connection to the track carriage.

Shock absorber 184 includes a hydraulic damper 185 and a coil spring 186, and is journaled at its upper end upon the center portion of a cross-shaft 188. The lateral ends of cross-shaft 188 mount into the sides of track tunnel 116 rearward of the position where cross-shaft 132 mounts swingarm 120 to track tunnel 116. Tunnel idler wheels 148 are also journaled on cross-shaft 188 and are retained in proper location by a set of tubular spacers 202. Referring additionally to FIG. 10, bell crank 168 includes a bell crank fulcrum tube 169, a center arm 171 located centrally on fulcrum tube 169, a pair of long side arms 173, one at each end of fulcrum tube 169, and a pair of short side arms 175, one at each end of fulcrum tube 169. Bell crank 168 could, for example, be manufactured using extruded aluminum tubing for fulcrum tube 169 with center arm 171 machined from billet aluminum and welded to the exterior center of fulcrum tube 169. A pair of side arm members, each comprising one of long side arms 173 and one of short side arms 175, could be fabricated from aluminum plate stock and welded to the ends of fulcrum tube 169. The interior of fulcrum tube 169 could be machined to accept bearing components forming a fulcrum pivot 170. Bell crank 168 could also be fabricated from steel or other suitable material. Fulcrum pivot 170 is concentric with fulcrum tube 169 and is journaled upon a bell crank fulcrum cross-shaft 180 that attaches to side members 122 of swingarm 120. The lower end of shock absorber 184 connects to a shock absorber pivot 172 located on center arm 171 with a pivot bolt 190. A connecting link 192 connects pivotally between a connecting link pivot 174 on each long side arm 173 of bell crank 168 and a forward suspension mount 154 of each slide rail 129. Limiter links 198 each connect at their rearward ends to a limiter link pivot 176 on each short side arm 175 of bell crank 168. A limiter slot 206 at the forward end of each limiter link 198 encircles one of spacers 202 on cross-shaft 188. Limiter slots 206 are free to pivot and slide longitudinally upon spacers 202 within the range between the ends of the limiter slots. As described, bell crank 168 has 5 separate arms, but is referred to as a three-arm bell crank because both long side arms 173 are laterally in tandem and perform the same function, and both short side arms 175 are laterally in tandem and perform the same function. A suspension limit bumper 208 is mounted on the forward portion of each slide rail 129 aligned to contact tubular member 124 of swingarm 120 when the track suspension is fully compressed.

Snowmobile Track Suspension Embodiment—operational Description

In operation, referring to FIGS. 8–10, the second embodiment three-arm bell crank track suspension supportably cushions snowmobile 110 upon the lower run of track 140, and operates as follows. Shock absorber 184 exerts spring and damping suspension force between cross-shaft 188 mounted to track tunnel 116 and shock absorber pivot 172 of bell crank 168, thereby urging bell crank 168 counterclockwise (as viewed in FIG. 8) around bell crank fulcrum cross-shaft 180. Bell crank 168 transfers this force from shock absorber 184 through cross-shaft 180 to swingarm 120 and through connecting links 192 to the forward portions of slide rails 129 of track carriage 128. The force from shock absorber 184 apportioned by bell crank 168 through connecting links 192 to track carriage 128 urges the track carriage downward (counterclockwise as viewed in FIG. 8) around the pivot connection of track carriage 128 to swingarm 120 at cross-shaft 134. The force from shock absorber 184 apportioned by bell crank 168 through cross-shaft 180 to swingarm 120 urges the swingarm downward (clockwise as viewed in FIG. 8) about the pivot connection of swingarm 120 to track tunnel 116 at cross-shaft 132. This urges the rearward end of track carriage 128 downward.

In this manner, bell crank 168 apportions the suspension force from shock absorber 184 to both the forward end and the rearward end of track carriage 128 in predetermined proportion. This predetermined proportion is a design function of the distances and angles between the fulcrum and arm pivots of bell crank 168; the distances and angles between the upper pivot, lower pivot, and bell crank pivot of swingarm 120; the distance and angle between swingarm forward cross-shaft 132 and the mounting position of cross-shaft 188 to track tunnel 116; and the lengths of connecting links 192. By adjusting these design parameters - singly or in combination—a desired track weighting distribution as a function of the amount of track suspension compression can be implemented. This force-distributing bell crank suspension allows track carriage 128 to incline and decline freely to fractionally comply with the profile of the terrain being traversed by snowmobile 110 while maintaining the predetermined track weighting distribution.

Referring to FIG. 11A, the three-arm bell crank snowmobile track suspension is shown in the fully extended position. FIG. 11B illustrates the snowmobile track suspension in fully compressed position. Ideally, a track suspension should employ a linear or progressive actuation of the shock absorber as the track suspension is compressed, rather than the regressive shock absorber actuation exhibited by most conventional snowmobile track suspensions. To accomplish a more progressive actuation of the shock absorber in the present invention, the angle formed between center arm 171 and shock absorber 184 is acute and preferably less than 45° when the track suspension is unload and extended. As viewed in FIG. 11A, this angle is illustrated as an interior angle B formed between the line intersecting pivot bolt 190 and cross-shaft 180 and the line intersecting pivot bolt 190 and cross-shaft 188. As the track suspension is loaded and compressed, the upward movement of swingarm 120 and the clockwise rotation of bell crank 168 cause this angle to increase until it is nearly 90° —illustrated in FIG. 11B as angle B'. When this angle is a smaller acute angle (for example, angle B when the track suspension is extended), a small incremental compression of the track suspension that causes a small angular rotation of bell crank 168 results in a smaller incremental compression of shock absorber 184 than occurs when the angle approaches 90° (for example, angle B' when the track suspension is compressed). The result is a track suspension that is soft or "plush" when nominally loaded as occurs during normal operation, but that stiffens up and resists suspension bottoming as the track suspension becomes heavily loaded and more fully compressed. This occurs, for example, when the track encounters a large bump or when the snowmobile is landing from a jump.

While the ability of track carriage 128 to freely incline and decline is desirable to enable tractional compliance of the lower run of the track with the snow surface over uneven terrain, excessive inclination or declination of track carriage 128 relative to the chassis of snowmobile 110 can be detrimental. Too severe an incline or decline angle of the track carriage relative to track tunnel 116 can cause the tension in track 140 to vary excessively, either becoming too taut and over-stressing the track and the track suspension components, or becoming slack and allowing the track to slip cogs on track drive sprockets 142. In soft or powder snow, the track carriage should best remain fairly level relative to snowmobile 110 to allow track 140 to provide optimum propulsion to the snowmobile.

To constrain the amount of track carriage inclination and declination, a limiting mechanism comprising short side arms 175 with limiter link pivots 176 of bell crank 168, limiter links 198, spacers 202 and cross-shaft 188 is implemented. When the forces between the snow surface and the lower run of track 140 are distributed so as to urge the track carriage to incline or decline beyond the allowed angles, such is prevented by the limiting mechanism. For example and as illustrated in FIG. 12, as the forward portion of track carriage 128 is forced upward as would occur when the forward end of the lower run of track 140 rolls up onto a bump, track carriage 128 inclines causing bell crank 168 to rotate clockwise about cross-shaft 180. This is illustrated in FIG. 12 using alternate-position (dash-dot) lines. Since the weight loading from the snowmobile and rider on the rear suspension has not changed, the axial force in shock absorber 184 remains constant and the length of shock absorber 184 remains unchanged. The rotation of bell crank 168 therefore urges swingarm 120 to rotate clockwise around its pivot mount on cross-shaft 132 (as illustrated in alternate-position using dash-dot style lines in FIG. 12), forcing the rearward portion of track carriage 128 downward to compensate for the upward movement of the front of the track carriage. Referring to FIG. 13 (shown with the lateral left side idler wheel 148 removed for clarity of illustration), the clockwise rotation of bell crank 168 and swingarm 120 pulls limiter links 198 rearward until the forward ends of limiter slots 206 contact spacers 202. Spacers 202 prevent further rearward motion of limiter links 198, which now inhibit further rotation of bell crank 168 and swingarm 120, thus preventing further inclination of track carriage 128.

When the rearward end of track carriage 128 is forced upward as would occur when track 140 is rolling over a bump near its rearward extremity, the track carriage declines causing bell crank 168 and swingarm 120 to rotate counterclockwise. This is shown in FIGS. 12 and 13 illustrated in solid line style. This forces limiter links 198 forward until the rearward ends of limiter slots 206 contact spacers 202. Spacers 202 prevent further forward movement of limiter links 198, inhibiting further counterclockwise rotation of bell crank 168 and swingarm 120, thereby preventing track carriage 128 from declining beyond a predetermined angle. The length of limiter slots 206 determines the angular range of inclination and declination allowed for track carriage 128 throughout the full travel range of the track suspension.

Referring to FIG. 12, there is a location along the lower edges of slide rails 129 labeled C where the height of the bottom of track carriage 128 relative to the snowmobile chassis (that is, relative to cross-shaft 132 and cross-shaft 188) is constant throughout the range of inclination and declination of the track carriage. This is the point at which the track carriage would rock from inclined—to level—to declined when passing over a bump, and is the center of the weighting distribution of snowmobile 110 on the lower run of track 140. Point C is located well forward of the pivot attachments of swingarm 120 to track carriage 128. This track weighting distribution center C moves forward along slide rails 129 tracing a nearly vertical path relative to snowmobile 110 as the track suspension is compressed. This forward movement of the center of the track weighting distribution C relative to the track carriage results from the progressive actuation of shock absorber 184 by bell crank 168 which transmits proportionally larger percentages of the shock absorber force to the forward portion of the track carriage as the track suspension is compressed. Because of this, the variation of track path-length (and hence, the variation in track tension) as a consequence of the inclination and declination of the track carriage is much less than the variation would be if the track weighting distribution center C were to remain in a fixed location or move rearward on the track carriage during suspension compression as occurs in most conventional snowmobile track suspensions.

In a track suspension-compressing impact where the forces acting on track carriage 128 are not uniformly distributed along the length of the lower run of track 140, the inclination or declination of track carriage 128 is limited. This would occur, for example, when the snowmobile is landing from a jump onto a bump contacting only the forward portion of the ground-contacting run of track 140. In such an event, the impact-forced inclination of track carriage 128 causes bell crank 168 to rotate clockwise, causing the forward ends of limiter slots 206 of limiter links 198 to contact spacers 202. Limiter links 198 then prevent further separation between limiter link pivots 176 of bell crank 168 and cross-shaft 188. Further compression of the track suspension from the impact force on the front portion of the track causes bell crank 168 to rotate clockwise about limiter link pivots 176, compressing shock absorber 184 and lifting swingarm 120 counter-clockwise around cross-shaft 132. Further inclination of track carriage 128 due to the landing impact is prevented, and the angle of inclination of the track carriage relative to track tunnel 116 is limited throughout the subsequent compression of the track suspension. If track 140 lands on bump at its rearward extremity, the impact-induced counterclockwise rotation of swingarm 120 around cross-shaft 132 creates a force couple between cross-shaft 180 and the connection of shock absorber pivot 172 of bell crank 168 to the lower end of shock absorber 184. This force couple causes a counterclockwise rotation of bell crank 168 that forces the forward end of track carriage 128 downward. Limiter links 198 are forced forward by the counterclockwise rotation of bell crank 168 until the rearward ends of limiter slots 206 contact spacers 202, preventing further counterclockwise rotation of bell crank 168. The continued impact-induced upward counterclockwise rotation of swingarm 120 now forces bell crank 168 to rotate clockwise around limiter link pivots 176 in short side arms 175, compressing shock absorber 184 and lifting the forward end of track carriage 128 through connecting links 192. The declination of track carriage 128 is thereby constrained to a limited angle of declination throughout the remaining impact-induced compression of the track suspension.

Although the invention has been shown and described with reference to the foregoing preferred embodiments, various other embodiments of the invention are possible. It is to be understood, therefore, that these and other embodiments may be made without departing from the spirit and scope of the invention as defined in the following claims.

What is claimed is:

1. A snow vehicle comprising a chassis, a ski, an endless-loop track, and a track suspension for cushioned support of the snow vehicle chassis upon a lower run of the endless-loop track, the track suspension comprising:
   a track carriage configured to moveably bear upon an interior surface of the lower run of the endless-loop track;
   a swingarm having a front and a rear, the rear of the swingarm pivotally attached to the track carriage at a first location and the front of the swingarm pivotally attached to the snow vehicle chassis;
   a bell crank having a fulcrum and first, second and third arms, the fulcrum pivotally attached to the swingarm;
   a cushion having a first end pivotally attached to the first arm of the bell crank and a second end pivotally attached to the snow vehicle chassis;
   a first link pivotally connected between the second arm of the bell crank and the track carriage, the first link pivotally connected to the track carriage at a second location displaced from the first location; and
   a second link having a first end pivotally attached to the third arm of the bell crank and a second end pivotally connecting to the snow vehicle chassis.

2. The snow vehicle according to claim 1 wherein the cushion is a shock absorber comprising a hydraulic damper and a spring.

3. The snow vehicle according to claim 1 wherein the second link comprises a linkage that limits the length between the first and the second ends of the second link to a minimum compressed length and a maximum extended length.

4. The snow vehicle according to claim 3 wherein the linkage comprises a telescoping member having an extension stop that limits the maximum extended length.

5. The snow vehicle according to claim 3 wherein the linkage comprises a telescoping member having a compression stop that limits the minimum compressed length.

6. The snow vehicle according to claim 3 wherein the linkage comprises a pin through a slotted hole that both pivots and slides on the pin over the length of the slotted hole.

7. The snow vehicle according to claim 1 wherein the second link comprises a resilient cushion.

8. The snow vehicle according to claim 1 wherein the second link comprises a shock absorber.

9. The snow vehicle according to claim 1 wherein the snow vehicle is a snow cycle and the track carriage additionally comprises a track drive sprocket configured to drivingly engage the interior surface of the endless-loop track.

10. The snow vehicle according to claim 1 wherein the track carriage comprises a track carriage frame, a left track slide and a right track slide, the left and right track slides configured to bear slidingly upon the interior surface of the lower run of the endless-loop track, the right track slide spaced laterally from the left track slide.

11. The snow vehicle according to claim 10 wherein the snow vehicle is a snowmobile and the track carriage frame comprises a left slide rail mounting the left track slide, a right slide rail laterally spaced from the left slide rail and mounting the right track slide, and at least one cross-member mounted between the left slide rail and the right slide rail.

12. The snow vehicle according to claim 11 wherein the cross-member comprises a cross-shaft mounted between the left track rail and the right track rail.

13. The snow vehicle according to claim 1 wherein the bell crank second arm comprises a left second arm on the lateral left side of the bell crank and a right second arm on the lateral right side of the bell crank, the track carriage second location comprising a left second location and a right second location, the first link comprising a left first link pivotally connecting between the left second arm and the left second location of the track carriage, and a right first link pivotally connecting between the right second arm of the bell crank and the right second location of the track carriage.

14. The snow vehicle according to claim 1 wherein the bell crank third arm comprises a left third arm on the lateral left side of the bell crank and a right third arm on the lateral right side of the bell crank, the second link comprising a left second link and a right second link, the left second link pivotally connected between the left third arm of the bell crank and the snow vehicle chassis, and the right second link pivotally connected between the right third arm of the bell crank and the snow vehicle chassis.

15. A track suspension configured for attachment to a chassis of a snow vehicle to provide cushioned support of the snow vehicle upon a lower run of an endless-loop track of the snow vehicle, the track suspension comprising:
   a track carriage configured to moveably bear upon an interior surface of the lower run of the endless-loop track of the snow vehicle;
   a swingarm having a front and a rear, the rear of the swingarm pivotally attached to the track carriage at a first location and the front of the swingarm configured for pivotal attachment to the snow vehicle chassis;
   a bell crank having a fulcrum and first, second and third arms, the fulcrum attached pivotally to the swingarm at a location displaced from the front of the swingarm;
   a cushion having a first end pivotally attached to the first arm of the bell crank and a second end configured for pivotal attachment to the snow vehicle chassis at a location displaced from the location of the attachment of the swingarm to the snow vehicle chassis;
   a first link pivotally connected between the second arm of the bell crank and the track carriage, the first link pivotally connected to the track carriage at a second location displaced from the first location; and a second link having a first end pivotally connected to the third arm of the bell crank and a second end configured for pivotal connection to the snow vehicle chassis at a location displaced from the location of the attachment of the swingarm to the snow vehicle chassis.

16. The track suspension according to claim 15 wherein the cushion is a shock absorber comprising a hydraulic damper and a spring.

17. The track suspension according to claim 15 wherein the second link comprises a linkage that limits the length between the first and the second ends of the second link to a minimum compressed length and a maximum extended length.

18. The track suspension according to claim 17 wherein the linkage comprises a telescoping member having an extension stop that limits the maximum extended length.

19. The track suspension according to claim 17 wherein the linkage comprises a telescoping member having a compression stop that limits the minimum compressed length.

20. The track suspension according to claim 17 wherein the linkage comprises a pin through a slotted hole that both pivots and slides on the pin over the length of the slotted hole.

21. The track suspension according to claim 15 wherein the second link comprises a resilient cushion.

22. The track suspension according to claim 15 wherein the second link comprises a shock absorber.

23. The track suspension according to claim 15 wherein the track suspension is a snow cycle track suspension and the track carriage additionally comprises a track drive sprocket configured to drivingly engage the interior surface of the endless-loop track.

24. The track suspension according to claim 15 wherein the track carriage comprises a track carriage frame, a left track slide and a right track slide, the left and right track slides configured to bear slidingly upon the interior of the lower run of the endless-loop track, the right track slide spaced laterally from the left track slide.

25. The track suspension according to claim 24 wherein the track suspension is a snowmobile track suspension and the track carriage frame comprises a left slide rail mounting the left track slide, a right slide rail laterally spaced from the left slide rail and mounting the right track slide, and at least one cross-member mounted between the left slide rail and the right slide rail.

26. The track suspension according to claim 25 wherein the cross-member comprises a cross-shaft mounted between the left track rail and the right track rail.

27. The track suspension according to claim 15 wherein the bell crank second arm comprises a left second arm on the lateral left side of the bell crank and a right second arm on the lateral right side of the bell crank, the track carriage second location comprising a left second location and a right second location, the first link comprising a left first link pivotally connecting between the left second arm and the left second location of the track carriage, and a right first link pivotally connecting between the right second arm of the bell crank and the right second location of the track carriage.

28. The track suspension according to claim 15 wherein the bell crank third arm comprises a left third arm on the lateral left side of the bell crank and a right third arm on the lateral right side of the bell crank, the second link comprising a left second link and a right second link, the left second link having a first end pivotally attached to the left third arm of the bell crank and a second end configured for pivotal connection to the snow vehicle chassis, the right second link having a first end pivotally attached to the right third arm of the bell crank and a second end configured for pivotal connection to the snow vehicle chassis.

29. A snow cycle comprising a chassis, a single ski, a single endless-loop track, and a track suspension for cushioned support of the snow cycle chassis upon a lower run of the endless-loop track, the track suspension comprising:

a track carriage configured to moveably bear upon an interior of the lower run of the endless-loop track, the track carriage comprising a track drive sprocket drivingly engaging an interior surface of the endless-loop track, the track drive sprocket rotatingly mounted to a rearward portion of the track carriage, the endless-loop track looping forward from the track drive sprocket;

a swingarm having a front and a rear, the rear of the swingarm pivotally attached to a rearward portion of the track carriage and the front of the swingarm pivotally attached to the snow cycle chassis;

a bell crank having a fulcrum and first, second and third arms, the fulcrum pivotally attached to the swingarm;

a shock absorber having a first end pivotally attached to the first arm of the bell crank and a second end pivotally attached to the snow cycle chassis;

a first link pivotally connected between the second arm of the bell crank and the track carriage, the first link pivotally connected to the track carriage at a location displaced from the pivotal attachment of the swingarm to the track carriage; and a second link having a first end pivotally attached to the third arm of the bell crank and a second end pivotally connected to the snow cycle chassis, the second link configured to limit the length between the first end and the second end of the second link to a minimum compressed length and a maximum extended length.

30. A snowmobile track suspension configured for attachment to a chassis of a snowmobile to provide cushioned support of the snowmobile upon a lower run of an endless-loop track of the snowmobile, the track suspension comprising:

a track carriage configured to moveably bear upon an interior surface of the lower run of the endless-loop track of the snowmobile;

a swingarm having a front and a rear, the rear of the swingarm pivotally attached to the track carriage at a first location and the front of the swingarm configured for pivotal attachment to the chassis;

a bell crank having a fulcrum and first, second and third arms, the fulcrum pivotally mounted to the swingarm at a location along a rearward half of the swingarm;

a shock absorber having a first end pivotally attached to the first arm of the bell crank and a second end configured for pivotal attachment to the snowmobile chassis at a location displaced from the location of the pivotal attachment of the swingarm to the chassis;

a first link pivotally connected between the second arm of the bell crank and the track carriage, the first link pivotally connected to the track carriage at a second location displaced from the first location; and a second link having a first end pivotally attached to the third arm of the bell crank and a second end configured for pivotal connection to the chassis at a location displaced from the location of the pivotal attachment of the swingarm to the chassis, the second link configured to limit the length between the first end and the second end of the second link to a minimum compressed length and a maximum extended length.

31. The track suspension according to claim 30 wherein the bell crank second arm comprises a left second arm on the lateral left side of the bell crank and a right second arm on the lateral right side of the bell crank, the track carriage second location comprising a left second location and a right second location, the first link comprising a left first link pivotally connecting between the left second arm and the left second location of the track carriage, and a right first link pivotally connecting between the right second arm of the bell crank and the right second location of the track carriage.

32. The track suspension according to claim 30 wherein the bell crank third arm comprises a left third arm on the lateral left side of the bell crank and a right third arm on the lateral right side of the bell crank, the second link comprising a left second link and a right second link, the left second link having a first end pivotally attached to the left third arm of the bell crank and a second end configured for pivotal connection to the snow vehicle chassis, the right second link having a first end pivotally attached to the right third arm of the bell crank and a second end configured for pivotal connection to the snow vehicle chassis.

* * * * *